March 13, 1945. M. J. JOHNSON 2,371,299
D'ARSONVAL-TYPE ELECTRICAL MEASURING INSTRUMENT
Filed Nov. 9, 1943 2 Sheets-Sheet 1

Inventor
Manfred J. Johnson
By Seymour Earl Nichols
Attorneys

March 13, 1945.  M. J. JOHNSON  2,371,299
D'ARSONVAL-TYPE ELECTRICAL MEASURING INSTRUMENT
Filed Nov. 9, 1943  2 Sheets—Sheet 2
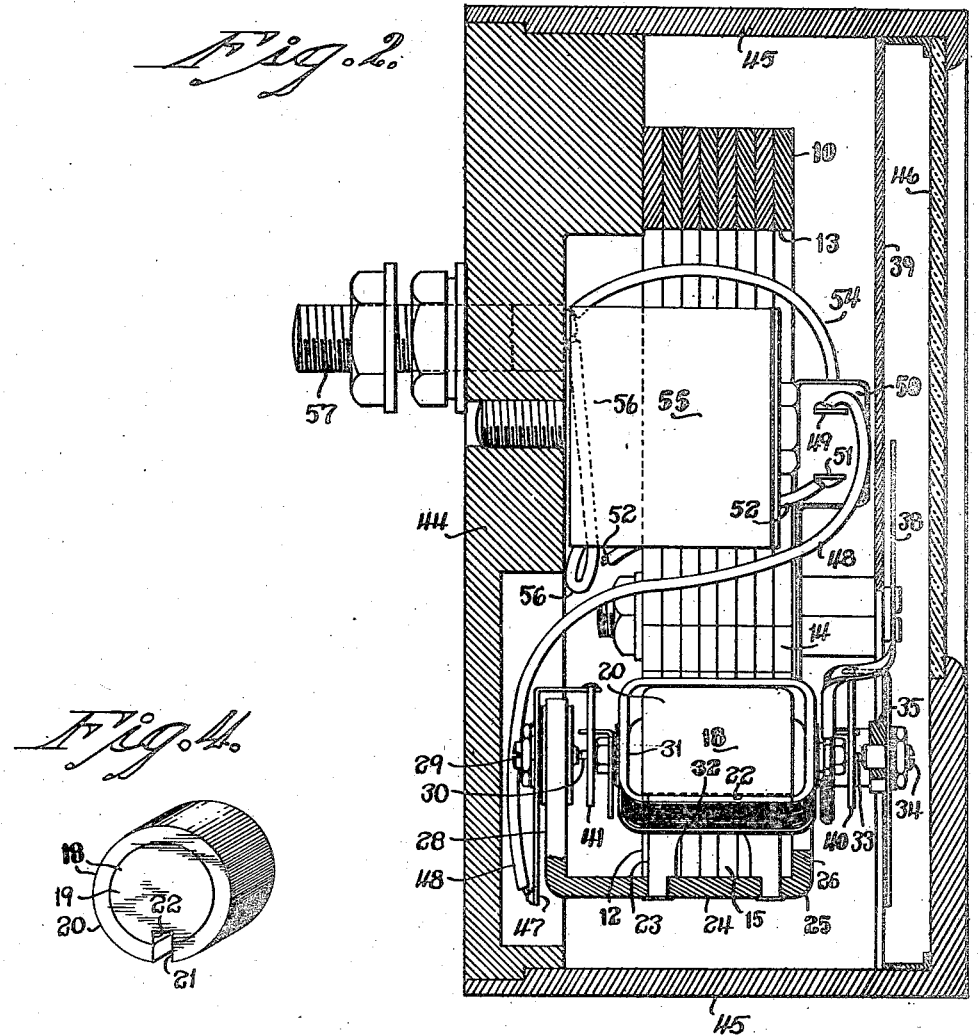
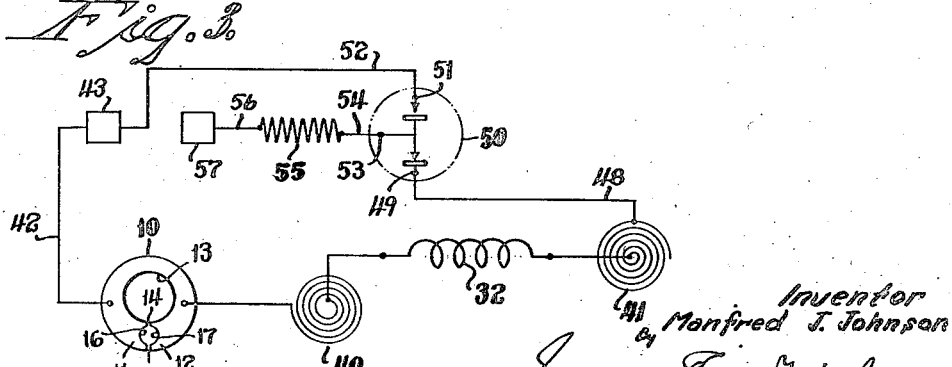
Inventor
Manfred J. Johnson
by Seymour Earl Nichols
Attorneys Patented Mar. 13, 1945

2,371,299

UNITED STATES PATENT OFFICE 2,371,299

D'ARSONVAL-TYPE ELECTRICAL MEASURING INSTRUMENT

Manfred J. Johnson, New Haven, Conn., assignor to The United States Time Corporation, a corporation of Connecticut Application November 9, 1943, Serial No. 509,566

4 Claims. (Cl. 171—95)

The present invention relates to improvements in electrical measuring instruments and relates more particularly to improvements in D'Arsonval-type electrical measuring instruments, i. e., electrical measuring instruments which include a moving coil and a permanent magnet. Instruments of the D'Arsonval-type embodying the present invention may have their dials graduated in full amperes, full volts, or multiples thereof, or the dials may be graduated in decimal or fractional parts of amperes or volts, as is well known in the art. In instances where temperatures are measured through the intermediary of electrical energy produced (as in a thermocouple), the dials of the instruments may be graduated in temperature-units.

The D-Arsonval-type electrical measuring instruments of the present invention are primarily designed for use in conjunction with rectifiers, resistors and other devices, the electro-conductivity of which increases with rises in temperature, and vice versa. The effect achieved by means of the present invention is substantially opposite to that achieved in the electrical measuring instruments set forth in my co-pending application Serial No. 500,065 filed August 26, 1943.

One of the objects of the present invention is to provide a superior D'Arsonval-type electrical measuring instrument suitable for use in conjunction with devices which have the characteristic of increasing electro-conductivity with increases in temperature, and vice versa, and which instrument will automatically compensate for such characteristics and provide accurate indications, despite marked temperature changes.

Another object of the present invention is to provide a superior instrument of the character referred to, in which simple, reliable and effective provision is made whereby increases in surrounding temperature will automatically cause the moving coil of the instrument to be subjected to lesser flux-densities as the surrounding temperature rises, and vice versa, whereby the instrument may be used in conjunction with rectifiers, resistors, or other devices having the characteristic of increased electro-conductivity with increases in temperature, and vice versa.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 3 is a diagrammatic view illustrating the electrical connections of the particular instrument shown;

Fig. 4 is a perspective view of the compensating-core; and

Fig. 5 is a perspective view of the permanent magnet.

Figure 1:
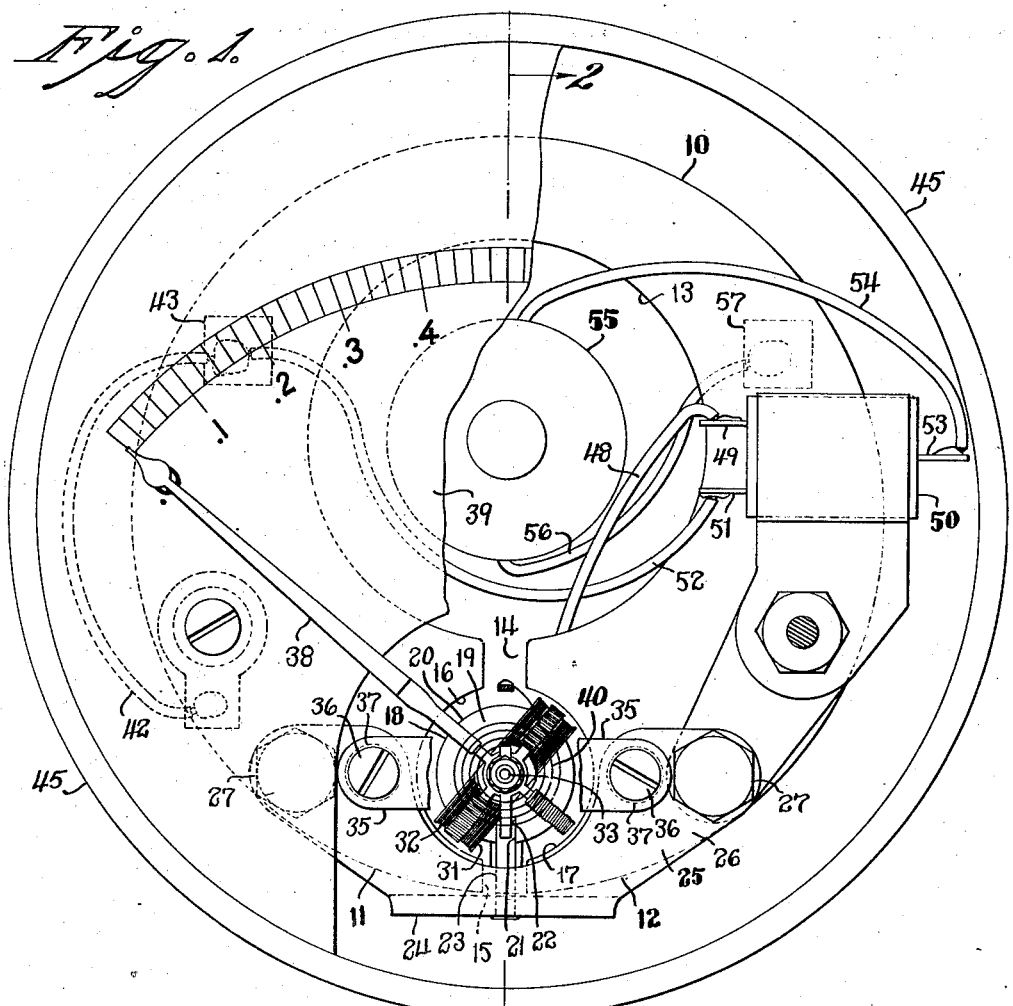
Fig. 1 is a view partly in front elevation and partly in section of one form of D'Arsonval-type measuring instrument embodying the present invention.

The particular D'Arsonval-type electrical measuring instrument illustrated in the accompanying drawings and chosen for purposes of making clear a preferred form of the present invention, includes a laminated permanent magnet generally designated by the reference character 10 and having a substantially C-shaped form. The said permanent magnet may be made in whole or in part of any suitable permanent magnet material such as cobalt steel, high carbon steel or any other suitable permanent-magnet material, and includes two opposed complemental pole salients 11 and 12 respectively of opposite polarities.

On the side of the permanent magnet 10 toward its central aperture 13, the pole salients 11 and 12 are separated by a gap 14, while adjacent their respective outer peripheral edges the said pole salients are separated from each other by a similar gap 15. The end-face of the pole salient 11 of the permanent magnet 10 is formed with a cylindrically-contoured substantially-semicircular notch 16 facing in opposition to a similar notch 17 formed in the end-face of the complemental pole salient 12. Both of the notches 16 and 17 just referred to are preferably cylindrically-contoured around a common center lying substantially midway between the complemental pole salients 11 and 12.

Located centrally in the space provided by the opposed notches 16 and 17 in the pole salients 11 and 12 on the permanent magnet 10 is a cylindrically-contoured compensating-core (Fig. 4) generally designated by the reference character 18. The said compensating-core includes a cylindrical inner member 19 and a substantially-tubular band-like outer member 20. The inner member 19 of the compensating-core 18 is preferably formed of soft iron or other highly permeable material having substantially no permanent-magnet characteristics. The band-like outer member 20 of the compensating-core 18 is formed of a material of a non-permanent magnet type, the reluctance of which increases as the temperature rises, and decreases as the temperature falls. Preferably the band-like outer member 20 of the compensating-core is formed of an alloy comprising about 29% to 33% nickel with a balance substantially all iron. The most preferable composition is nickel 30% and iron substantially 70%.

Another material well known in the electrical art and suitable for use in the makeup of the outer member 20 or its equivalent is an alloy composed of about 30% copper, about 66½% nickel, with the balance substantially of iron. Still another suitable composition having the reluctance characteristics above referred to is an alloy containing about 9½% copper, 88% nickel, with the balance substantially all iron. Stated in other words, the permeability of the band-like outer member 20 of the compensating-core 18 may be said to vary substantially inversely with respect to the temperature. In still simpler language it may be said that the magnetic-conductivity of the outer member 20 decreases with a rise in temperature and vice versa.

The outer member 20 of the compensating-core 18 is formed with a longitudinal slot 21 registering with a longitudinal slot 22 formed in the inner member 19. Extending into and staked in the slots 21 and 22 just referred to, is the inner end of a supporting-plate 23. The outer end of the said supporting-plate 23 is riveted into the central arm or reach 24 of a bracket generally designated by the reference character 25 and preferably formed of brass or other non-magnetic material.

Figure 2:
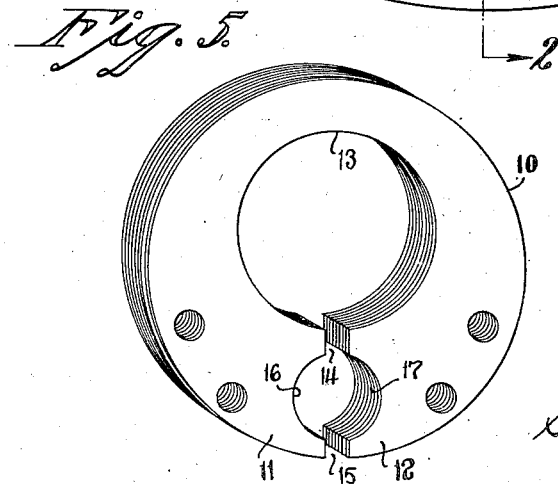
Fig. 2 is a transverse sectional view taken on the line 2—2 of Fig. 1.

The bracket 25 above referred to includes a bifurcated arm 26 which is secured at its respective opposite ends to the respective front faces of the pole salients 11 and 12 of the magnet 10 by means of bolts or screws 27—27. Opposite its bifurcated arm 26 and extending in parallelism therewith and hence at a right angle to the central arm or reach 24, the bracket 25 is formed with an arm 28 parallelling the adjacent rear faces of the pole salients 11 and 12 but spaced outwardly therefrom, as is especially well shown in Fig. 2.

Mounted in the arm 28 of the bracket 25 but insulated therefrom is a rear bearing-screw 29 into the inner end of which fits the conical rear end of a rear stud-like pivot 30. The said stud-like pivot 30 is secured centrally to the rear one of the four walls or reaches of a substantially-rectangular coil-supporting ring or frame 31. The said coil-supporting ring 31 is preferably formed of aluminum or other light non-magnetic material and has wrapped therearound a plurality of turns of wire forming what will be termed, for convenience of description, a coil 32. The said coil 32 will ordinarily be formed of enameled or otherwise insulated copper wire. The inner or front end of the stud-like pivot 30 is centrally secured to the adjacent rear wall or reach of the coil-supporting ring 31 over the coil 32 in any suitable manner as, for instance, by a cement of synthetic resin.

Mounted on the front wall or reach of the coil-supporting ring 31 diametrically opposite the pivot 30 and in axial alignment therewith, is a front stud-like pivot 33 generally corresponding to the said pivot 30 and cemented or otherwise secured to the said ring over the coil 32. The conical forward or outer end of the pivot 33 is seated for turning movement in the rear end of a front bearing-screw 34 which is mounted in a bridge-plate 35 preferably formed of brass or other non-magnetic material. The said bridge-plate 35 is secured in spaced relationship forwardly of the bifurcated arm 26 of the bracket 25 by means of two screws 36—36 and two complemental pillars 37—37. The inner ends of the said pillars are rigidly mounted in the bifurcated arm 26 of the bracket 25 in any suitable manner.

As thus pivotally mounted the coil-unit, comprising the coil-supporting ring 31 together with the coil 32, embraces the compensating-core 18, and the opposite side walls or reaches of both the said ring 31 and the coil 32 are interposed in the ring-like space between the outer periphery of the said compensating-core 18 and the concave cylindrically-contoured surfaces of the opposed notches 16 and 17 respectively formed in the pole salients 11 and 12.

Fixedly mounted upon the front pivot 33 of the coil-supporting ring 31 and the coil 32 is a pointer or indicating-member 38 preferably formed of aluminum or other light non-magnetic material and adapted in the usual manner of electrical measuring instruments to sweep over a dial 39.

In a manner well known in the D'Arsonval-type instrument art, two opposed spiral hairsprings 40 and 41 are employed which, in the instance shown, are respectively located adjacent the front and rear pivots 30 and 33. One terminal of the coil 32 is electrically connected through the front hairspring 40 to the bridge-plate 35 and hence grounded to the permanent magnet 10.

A lead-wire 42 is connected to the permanent magnet 10 as shown in Fig. 1, and leads to a terminal-stud 43 mounted in the removable rear wall 44 of a casing 45 having a crystal 46 at its front.

The remaining terminal of the coil 32 is connected through the rear hairspring 41 to a regulating lever 47 rotatable about the rear bearing-screw 29 but insulated therefrom and from the associated parts. A lead-wire 48 has one end soldered, or otherwise connected, to the regulating lever 47 and leads therefrom to one terminal 49 of a duplex plate rectifier, generally designated by the reference character 50, and mounted within the case 45. The said plate rectifier 50 has a complemental terminal 51 which is connected by a lead-wire 52 extending to the terminal-stud 43 before referred to and located in the rear wall 44 of the case 45.

The remaining terminal 53 of the rectifier 50 is in the instance shown connected by a lead-wire 54 to one terminal of a resistor, generally designated by the reference character 55, and having its remaining terminal connected by a lead-wire 56 to a terminal-stud 57 mounted in the rear wall 44 of the case 45 and complementing the terminal-stud 43 before referred to.

The plate rectifier 50 may be assumed to be a selenium or similar rectifier having a negative temperature-coefficient, i. e., ability to pass larger currents with increases in temperature and vice versa.

The resistor 55 will ordinarily include a resistance wire having a positive temperature-coefficient, i. e., the characteristics of decreasing electro-conductivity with rises in temperature and vice versa such, for instance, as a nickel-chromium alloy.

With the rectifier 50 having the negative temperature-coefficient as above described, and the resistor 55 and coil 32 having positive temperature-coefficient characteristics, it might appear that these two opposite temperature-coefficients would offset each other to maintain the accuracy of the instrument.

However, under most conditions the negative temperature-coefficient of the rectifier 50 or its equivalent will ordinarily more than offset the combined positive temperature-coefficients of the coil 32 and resistor 55 so that more than the proper and predetermined current would pass through the coil 32 when the temperature rises, thus causing the instrument to read high at elevated temperatures. This high reading, however, is prevented by the characteristics of the compensating-core 18 which decreases in magnetic-conductivity (increases in reluctance) with temperature rises and vice versa. Thus, when a temperature rise causes the rectifier 50 or its equivalent to pass a greater amount of current, the compensating-core 18 will be appropriately proportioned so that it will coincidentally decrease the flux-density between the pole saliencs 11 and 12 of the permanent magnet 10, with the result that the increase in current in the coil 32 will have proportionately less flux-density to react upon. This results in substantially correcting the action of the rectifier 50 so that the readings of the instrument will remain substantially uniform despite marked changes in temperature and marked changes in the amount of current passed by the rectifier 50 under different temperature conditions.

Conversely, when the temperature of the instrument is lowered, the rectifier 50 or its equivalent will pass less current and despite the ability of the coil 32 and resistor 55 to pass more current at this lowered temperature, errors would still ordinarily result. The lowering of the temperature however, causes the magnetic-conductivity of the compensating-core 18 to decrease, thereby providing proportionately lesser flux-density for the coil 32 to react upon.

Should it be desired for any reason to employ a resistor, such as a carbon resistor having a negative temperature-coefficient, either alone or in conjunction with a rectifier having a negative temperature-coefficient, the compensating-core 18 or its equivalent may be appropriately proportioned to vary the effectiveness of the air gap between the pole saliencs 11 and 12 and thus automatically compensate for the effects of temperature changes in other devices to which the coil 32 is connected.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A D'Arsonval-type electrical measuring instrument adapted for use in conjunction with devices having negative temperature-coefficients, including in combination: a permanent magnet having complemental pole-saliencs respectively of opposite polarity; a movable coil-unit having a movable coil mounted in the field between the complemental pole-saliencs of the said permanent magnet; indicating-means operatively connected to the said movable coil-unit for actuation thereby; and a compensating-core located within the movable coil of the said coil-unit and hence within the field between the complemental pole-saliencs of the said permanent magnet, the said compensating-core including a magnetic material which decreases in magnetic-conductivity as its temperature rises and vice versa, the said compensating-core being constructed and arranged to cause a decrease in the flux-density to which the coil of the said coil-unit is subjected as the temperature rises and to cause an increase in the flux-density to which the said coil is subjected as the temperature falls.

2. A D'Arsonval-type electrical measuring instrument adapted for use in conjunction with devices having negative temperature-coefficients, including in combination: a permanent magnet having complemental pole-saliencs respectively of opposite polarity; a movable coil-unit having a movable coil mounted in the field between the complemental pole-saliencs of the said permanent magnet; indicating-means operatively connected to the said movable coil-unit for actuation thereby; and a compensating-core located within the movable coil of the said coil-unit and hence within the field between the complemental pole-saliencs of the said permanent magnet, the said compensating-core being formed partly of highly-permeable magnetic material and partly of a magnetic material which decreases in magnetic-conductivity as its temperature rises and vice versa, the said compensating-core being constructed and arranged to cause a decrease in the flux-density to which the coil of the said coil-unit is subjected as the temperature rises and to cause an increase in the flux-density to which the said coil is subjected as the temperature falls.

3. A D'Arsonval-type electrical measuring instrument adapted for use in conjunction with devices having negative temperature-coefficients, including in combination: a permanent magnet having complemental pole-saliencs respectively of opposite polarity; a movable coil-unit having a movable coil mounted in the field between the complemental pole-saliencs of the said permanent magnet; indicating-means operatively connected to the said movable coil-unit for actuation thereby; and a compensating-core located within the movable coil of the said coil-unit and hence within the field between the complemental pole-saliencs of the said permanent magnet, the said compensating-core including a substantially-annular member formed of highly-permeable magnetic material and a second annular member formed of magnetic material which decreases in magnetic-conductivity as its temperature rises and vice versa, the said compensating-core being constructed and arranged to cause a decrease in the flux-density to which the coil of the said coil-unit is subjected as the temperature rises and to cause an increase in the flux-density to which the said coil is subjected as the temperature falls.

4. A D'Arsonval-type electrical measuring instrument adapted for use in conjunction with devices having negative temperature-coefficients, including in combination: a permanent magnet having complemental pole-saliencs respectively of opposite polarity; a movable coil-unit having a movable coil mounted in the field between the complemental pole-saliencs of the said permanent magnet; indicating-means operatively connected to the said movable coil-unit for actuation thereby; and a compensating-core located within the movable coil of the coil-unit and hence within the field between the complemental pole-salients of the said permanent magnet, the said compensating-core including an inner-member formed of highly-permeable magnetic material and an outer band-like member formed of a magnetic material which decreases in magnetic-conductivity as its temperature rises and vice versa, the said compensating-core being constructed and arranged to cause a decrease in the flux-density to which the coil of the said coil-unit is subjected as the temperature rises and to cause an increase in the flux-density to which the said coil is subjected as the temperature falls.

MANFRED J. JOHNSON.